July 8, 1930.  E. K. BAKER  1,770,096
HYDRAULIC CHASSIS CONTROL
Original Filed April 25, 1928
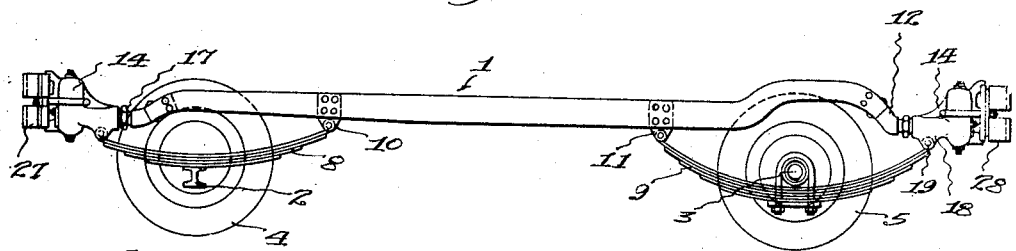
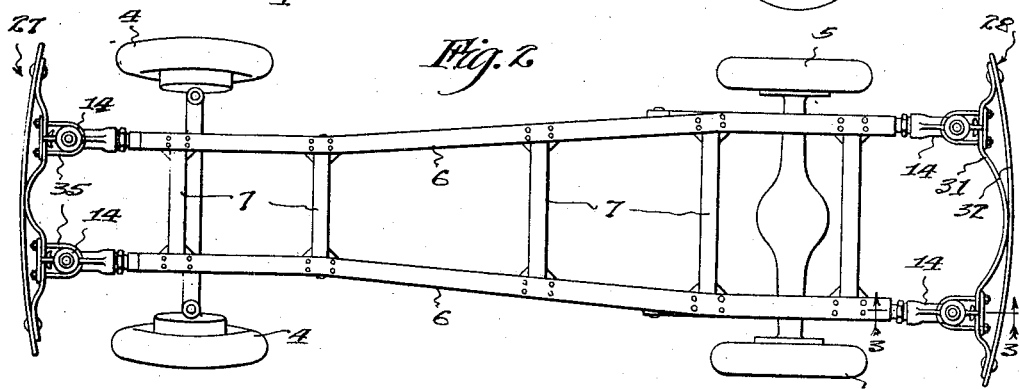
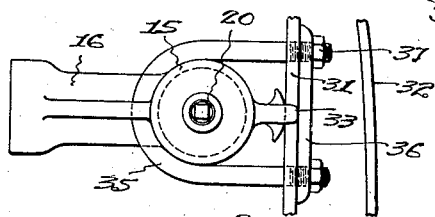
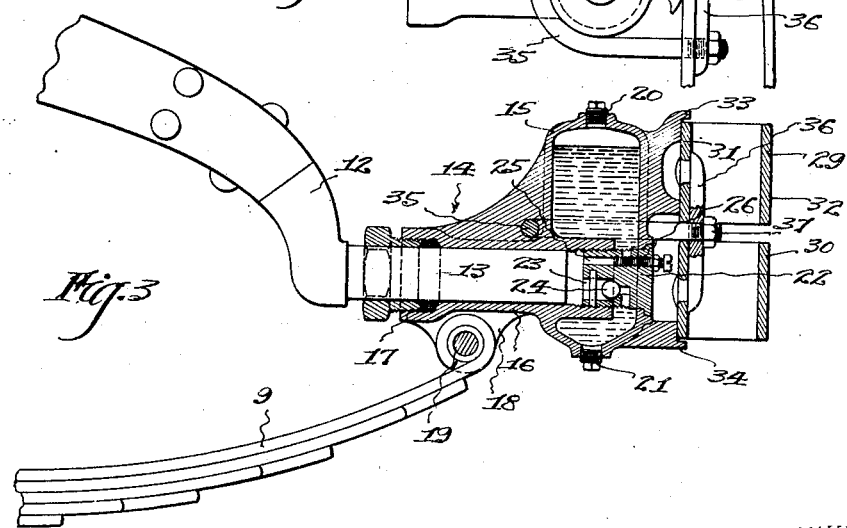
INVENTOR
Erle K. Baker
BY
ATTORNEY Patented July 8, 1930

1,770,096

UNITED STATES PATENT OFFICE

ERLE K. BAKER, OF CHICAGO, ILLINOIS

HYDRAULIC CHASSIS CONTROL

Application filed April 25, 1928, Serial No. 272,684. Renewed December 9, 1929.

This invention relates to improvements in hydraulic chassis controls and it consists of the matters hereinafter described and more particularly pointed out in the appended claims.

The primary object of the invention is to provide a hydraulic suspension between correlated parts of the chassis and supporting springs of an automobile which will eliminate the transmission of road shocks to the chassis and will reduce side swaying and resulting "shimmying" when the automobile is under way.

A further object of the invention is to provide a construction wherein shackle links are omitted and one which may be readily made at a low cost and is self-lubricating.

Still another object of the invention is to provide a construction which readily adapts itself to the use of bumpers, and so operates upon meeting an obstruction or being bumped as to readily take and absorb the shock without imparting it to the chassis with the quick sharp jolt as occurs in constructions now employed.

These objects of the invention as well as others together with the many advantages thereof will more fully appear as I proceed with my specification.

In the drawing:—

Fig. 1 is a view in side elevation of an automobile chassis embodying my improved hydraulic control.

Fig. 2 is a top plan view thereof.

Fig. 3 is a vertical longitudinal section on an enlarged scale through one of the connecting structures between one end of the chassis frame member and associated spring end, the plane of the section being taken on the line 3—3 of Fig. 2.

Fig. 4 is a top plan view of several of the parts shown in Fig. 3.

Referring now in detail to that embodiment of the invention illustrated in the accompanying drawing, 1 indicates as a whole the chassis frame of an automobile, 2 indicates the front axle and 3 indicates the rear axle thereof. Associated with the front axle are the steering wheels 4—4 and associated with the rear axle are the driving or traction wheels 5—5 all of which include the usual tires.

The chassis frame includes side frame members 6—6 and transverse connecting members 7—7 in the manner well known. The chassis frame is supported from the front and rear axles by pairs of front and rear leaf springs 8 and 9 respectively. In this instance, the rear end of each front spring is pivotally connected to a bracket 10 on the associated frame member 6 and the front end of each rear spring is likewise pivotally connected to a bracket 11 on the associated frame member.

While I have here illustrated connections which are pivotal in character these connections are intended to be merely illustrative of connections which prevent pronounced endwise movement of the springs such as a swinging shackle would permit.

As the connection between the front ends of the front springs and the rear ends of the rear springs are all the same, in that each includes relatively slidable parts actuated upon elongation of the associated spring ends due to flexing of the springs, a detailed description of one of such connections will suffice for all.

Each end of each chassis frame member has fixed thereto a downwardly curved horn 12 which terminates in a longitudinally extending horizontally disposed, cylindrical stem 13 which, because of its action may be likened to a plunger. Associated with each stem is a hollow casting 14 which includes an upright casing 15 and a laterally extending barrel 16 which slidably engages upon the plunger stem 13. A stuffing box arrangement 17 is provided on the free end of said barrel to snugly engage the plunger stem and on each side of the barrel is a depending ear 18 to which the associated spring end is pivotally connected by a pin and bushing 19.

The casing 15 which is hollow, provides a reservoir for a suitable fluid which is preferably a lubricating oil and in the top and bottom ends thereof are inlet and outlet openings normally closed by screw plugs 20 and 21 respectively. By means of these plugs the casing may be filled and drained for cleaning purposes when so necessary.

The barrel 16 has its inner end extended into the interior of the casing and is interiorly threaded to receive a plug 22 entered thereinto through the opposite side of the casing wall. In the bottom portion of said plug is a one way passage 23 so controlled by a ball valve 24 as to permit, under certain conditions, a passage of fluid from the bottom of the casing into the chamber of the barrel between the adjacent plug and plunger end but to prevent a reverse flow, that is from said chamber back into the bottom of the casing. In the top portion of said plug is a port 25 which opens into the upper portion of the casing and a screw 26 disposed in said port controls the amount or flow of fluid from said chamber into said casing so that the flow is restricted. The construction just above mentioned as well as its operation is more fully set forth in detail in my copending application filed April 4th, 1928, under Serial Number 271,015, and therefore, it is not thought necessary to go into further details herein.

With the parts assembled as described, when the wheels 4 or 5 engage such an obstruction in the roadway as would tend to transmit the resulting shock through the springs to the frame, the operation is as follows: Upon meeting such obstruction the outer ends of the springs will flex downwardly thus tending to flatten out and elongate so to speak. This will cause a longitudinal movement of the spring eye and pin 19 outwardly on the plunger stem thus enlarging the chamber in the barrel between the plunger and plug ends, and producing a vacuous condition therein which will cause a rapid flow of fluid from the bottom portion of the casing, through the port 23 into said chamber so that it is filled with fluid. So soon as the spring starts to flex back toward its normal condition, the barrel moves inwardly on the plunger and this builds up a pressure which immediately causes the ball 24 to close off the port 23. As the port 25 is open, the fluid is forced therethrough into the upper portion of the casing but at a greatly reduced flow so that the return movement of the spring is held under control due to the hydraulic action mentioned and is slow and even. Thus the transmission of road shocks or jars to the frame is greatly minimized.

The construction described ideally lends itself to the provision of coacting bumpers for each end of the frame in that end bumps as well as road shocks are controlled. To this end I provide with each pair of castings 14, a bumper indicated as a whole at 27 and 28 respectively, the former indicating the front bumper and the latter, the rear bumper.

Preferably each bumper is of the spring bar type which is in itself so formed as to have certain resiliency. Each bumper comprises upper and lower bumper bars 29 and 30 respectively, each formed to provide inner and outer portions 31 and 32 respectively as best shown in Fig. 2 and connected together at the ends as best found in the same figure.

On that wall part of each casing 15 opposite the associated barrel, I provide top and bottom lugs 33 and 34 respectively against which the inner and outer portions of each spring bar engage. To secure the said bar portions against said lugs I provide a U bolt 35 which embraces the casing 15 above the barrel and passes through the space between said bar portions and also through a clamping plate 36 on the outer face of said bar portions. Thereafter nuts 37 are applied to the bolt ends, and said nuts when snugly drawn up on the bolt act through the plate to securely clamp the bumper as a whole to the casing.

Assume that in backing up, the rear bumper meets an obstruction. This will cause first, a slight flexing or straightening out of the bumper bars and at the same time an inward movement of the casting on the plunger. Thus the chamber between the plunger and plug ends is reduced in size and such fluid as remains therein is slowly forced out through the port 25, to resist the movement of said casing. As this movement is thus resisted and slowed down, the casings of course will act to flex the springs 8 or 9 and said casings will also act to turn slightly on said plunger so that the shock of the bump is absorbed first in the bumper, next by the hydraulic action between the plunger and casing and then by the frame supporting springs themselves. The springs thus become an operative part of the bumper. Thus with many factors operating to the end of absorbing the bump, the shock thereof is reduced to that extent which makes it negligible so far as transmitting the same to the frame is concerned.

When only one wheel meets a road obstruction, the hydraulic means at that corner of the frame has that degree of flexibility as will permit said means to operate in the manner and for the purpose intended.

The construction described, eliminates shackle plates and their characteristics of permitting side sway of the body so that riding qualities are stabilized and made much more pleasant and enjoyable under any speed. It readily lends itself to a bumper construction, the parts of which are reduced to a minimum. Again the same means employed to control road shocks are indeed active in operation to control end bumps imposed through the bumpers whether from the front or rear.

While in describing my invention I have referred in detail to the form and arrangement of the parts thereof, I do not wish to be

I claim as my invention:—

1. A chassis spring control embodying therein a frame, front and rear springs, means connecting an end of each spring to the frame against substantial longitudinal movement, and means connecting the opposite end of each spring to the frame hydraulically to control the movement of said springs.

2. A chassis spring control embodying therein a frame, front and rear springs, means mechanically connecting an end of each spring to the frame against substantial longitudinal movement, and means connecting the opposite end of each spring to the frame hydraulically to control the movement of said springs.

3. A chassis spring control embodying therein a frame, front and rear springs, means connecting the rear ends of the front springs and the front ends of the rear springs to the frame against substantial longitudinal movement, and means connecting the front ends of the front springs and the rear ends of the rear springs to the frame hydraulically to control the movement of said springs.

4. A chassis spring control embodying therein a frame, front and rear springs, means mechanically securing the rear ends of the front springs and the front ends of the rear springs to the frame, and means for hydraulically securing the front ends of the front springs and the rear ends of the rear springs to the frame to control said springs.

5. A chassis spring control embodying therein a frame, front and rear springs, pivotal means connecting the rear ends of the front springs and the front ends of the rear springs to the frame, and means connecting the opposite ends of the springs to the frame for hydraulically controlled movement.

6. An automobile chassis construction embodying therein a frame, a bumper spaced from the end of the frame, hydraulic mechanism carried by the frame, and means connecting said bumper to said hydraulic mechanism whereby impact of the bumper is absorbed at least in part by said hydraulic mechanism.

7. An automobile chassis construction embodying therein a frame, a bumper spaced from the end of the frame, hydraulic mechanism carried by the frame, and means connecting said bumper to said hydraulic mechanism whereby impact of the bumper is absorbed at least in part by movement of said hydraulic mechanism longitudinally of the frame.

8. An automobile chassis embodying therein a frame, springs, hydraulic mechanism carried by the frame, a bumper spaced from the end of the frame, said springs and bumper both being connected to said hydraulic mechanism whereby said hydraulic mechanism serves to control the action of the springs and bumper.

9. A chassis spring control embodying therein a frame, front and rear springs, means connecting an end of each spring to the frame against substantial longitudinal movement, a plunger rigid with respect to each end of the frame, and a hydraulic cylinder pivotally connected to the other end of each spring and each operatively engaged by an associated plunger.

10. A chassis spring control embodying therein a frame, front and rear springs, means connecting an end of each spring to the frame against substantial longitudinal movement, a longitudinally disposed plunger rigid with each end of the frame and extending away therefrom and a hydraulic cylinder pivotally connected to the other end of each spring and each operatively engaged by an associated plunger.

11. A chassis spring control embodying therein a frame, front and rear springs, means connecting an end of each spring to the frame against substantial longitudinal movement, a longitudinally disposed plunger rigid with each end of the frame and a hydraulic cylinder pivotally connected to the other end of each spring and each operatively engaged by an associated plunger.

12. A chassis spring control embodying therein a frame, front and rear springs, means connecting the front ends of the rear springs and the rear ends of the front springs to the frame against substantial longitudinal movement, a horizontally disposed plunger rigid with respect to portions of the frame and hydraulic cylinders pivotally connected to the rear ends of the rear springs and the front end of the front springs and each operatively engaged by an associated plunger.

In testimony whereof, I have hereunto set my hand, this 23rd day of April, 1928.

ERLE K. BAKER.